3,183,901
COMPRESSION-COMPENSATING MEANS
FOR POPPET VALVES
Niel C. Thuesen, 6021 Compton Ave., Los Angeles, Calif.
Filed Jan. 29, 1965, Ser. No. 428,953
6 Claims. (Cl. 123—90)

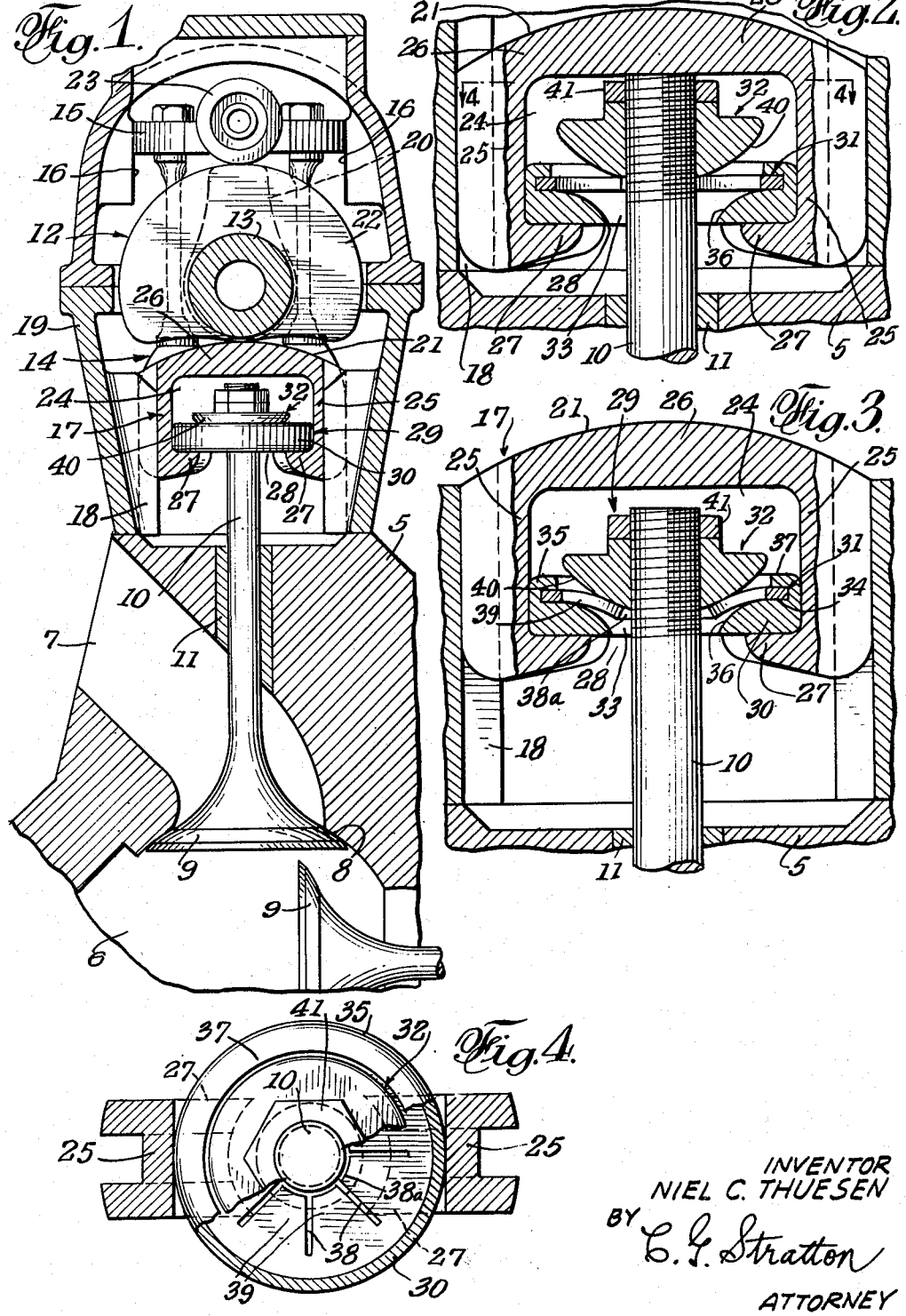

This invention relates to means for effecting resilient compensation during the seating of a poppet valve and has for an object to provide such means that will compensate for both small and inordinately large carbon or other particles, which ordinarly would prevent seating of a valve, the present means, thereby, saving the valve, its stem, and the valve-reciprocating means from damage and deterioration that may be caused by such particles.

Another object of the invention is to provide compression-compensating means, as characterized above, which enables easy and accurate assembly and operative alignment of the valve and the means that reciprocates the valve.

A further object of the invention is to provide compression-compensating means that allows for a substantial over travel of the valve-reciprocating means and yet does not embody the time lag, flutter, and other undesired characteristics of helical or coil springs, most frequently used for compensating for extraneous particles trapped between a poppet valve and the seat thereof.

A still further object of the invention is to provide compression-compensating means that is entirely metallic to better withstand high ambient heat and, if damaged, is readily replaced at low cost.

This invention also has for its objects to provide such means that are positive in operation, convenient in use, easily installed in a working position and easily disconnected therefrom, economical of manufacture, relatively simple, and of general superiority and serviceability.

The above objects are realized in a construction that comprises a cage which is reciprocated by rotational complementary or reciprocal cam means to move a poppet valve toward and from seated position controlling flow in a port. The cam means is provided on a cam shaft located between an outer cage part and in inner tappet part, said parts being connected by rods or bars in tension arranged in pairs on opposite sides of the cam shaft. Guides are provided for said cage parts for sliding movement on the axis of a poppet valve toward and from a valve seat through which the valve controls flow.

The present compression-compensating means is mounted on the outer end of the stem of the poppet valve and is engaged with the tappet part of the cage by means of support ledges extending toward each other from opposite sides and are spaced apart to provide ample clearance for the valve stem.

The present compression-compensating means comprises a ring part that is supported on said ledges and has a swaged flange portion that engages over the outer margin of a tension disc which has radially inwardly directed spring fingers. An adjustable bearing member is carried by the stem. Said member and ring part have opposite convexly curved annular faces that are on opposite sides of the fingers of the tension disc and cooperate to guide the flexure of said fingers between a set minimum, as when the valve closes fully on its seat, and a more flexed condition to a degree according to the size or thickness of a particle trapped between the valve and its seat.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a longitudinal sectional view of a poppet valve mechanism and embodying compression-compensating means according to the present invention, the view showing the valve in fully seated position.

FIG. 2 is an enlarged and fragmentary sectional view of said compression-compensating means in the position thereof with the valve spaced from its seat.

FIG. 3 is a simalr view in the position thereof with the valve seated, as in FIG. 1.

FIG. 4 is a cross-sectional view as taken on the line 4—4 of FIG. 2, some of the parts being broken away for clearer illustration.

The present compression-compensating means is provided in poppet valve mechanism that is mounted on a cylinder block 5 of an internal combustion engine or the like, said block having a cylinder chamber 6 and a communicating flow passage 7 with a valve seat 8 where said passage joins the cylinder chamber. A poppet valve 9 controls flow between said chamber and passage and, when closed against the seat 8, shuts off said flow. A stem 10 on valve 9 extends through a guide bushing 11 in the block. The valve stem is shown vertical in FIG. 1 but, in practice, as in V-motors, the same will be disposed at an angle to the vertical—45° and 60° being the most common.

FIG. 1 shows reciprocal cam means on a cam shaft 13 that is in overhead relation to the block 5, said cam means being engaged with and reciprocating a cage 14 having an outer part 15 movable in longitudinal guides 16, and an inner tappet part 17 movable in aligned guides 18. Said guides 16 and 18 are provided in a housing 19 that is mounted on the cylinder block, the housing enclosing said cam means 12 and the cage 14. The guides 16 and 18 are aligned on the axis of the valve stem 10 and, therefore, with the seat 8.

The cam means 12 comprises a cam 20 that, by engaging the convex face 21 of the tappet part 17, propels the cage in a direction toward the valve seat 8, and a cam or rather two identical laterally offset cams 22 that, by engaging cam followers 23 on the outer cage part 15, propel the cage in a valve-closing direction.

The tappet part 17 is provided with a space 24 that is defined between side walls 25, an upper wall 26 (the face 21 being provided on the outer side of said wall), and two inwardly directed ledges 27 between which is provided a space 28 that constitutes an inner opening for the space 24.

The present compression-compensating means 29 occupies the space 24. Said means comprises, generally, a ring member 30 that is shown as circular but may have any desired polygonal outer form, a tension disc 31 mounted in the ring member 30, and a bearing member 32 adjustably carried by the portion of the valve stem 10 that extends through the space 28 into the space 24.

The ring member is supported by the ledges 27 and is centered by the walls 25, as shown in the several views. The ring member has a central hole 33 substantially larger than the valve stem 10 which, therefore, passes through said hole with substantial clearance even when there is non-alignment of the stem and the ring member 30. In practice, said ring member is provided with an annular seat 34 from the outer edge of which a flange 35 extends. From said seat inward, the ring member is formed to have a convexly curved annular face 36, the same extending toward and terminating at the hole thereof.

The tension disc 31 comprises a generally flat spring member with its outer margin disposed on the seat 34 and fixedly clamped thereon by an inwardly spun or swaged portion 37 of the flange 35. Said disc, by means of slits 38 that extend preferably radially from a central hole 38a toward but short of the disc margin, is divided into a plurality of spring fingers 39 that are adapted to flex in a direction transverse to the plane of the disc—in this instance, toward the convex face 36.

The bearing member 32 is threadedly connected to the stem 10 and has a convex face 40 that is opposed to the face 36 of the ring member and has adjusted engagement with the fingers 39. The bearing member, as shown in FIG. 2, is adjusted on the stem 10 so that the end of the stem bears against the wall 26 while the face 40 has a pre-adjusted bearing with the ends of fingers 39. A slight but varying flexure may be imparted to said fingers by adjustment of member 32, a nut 41 being provided to lock the adjustment.

It will be obvious from the foregoing that, since the stem end bears on the tappet wall 26, while the ring member has bearing support on the ledges 27, the cage 14 bodily carries the valve 9 toward and from its seated engagement with the seat 8. This is the normal position shown in FIG. 2. When the valve 9 achieves closing engagement with seat 8, its movement under control of cams 22 is arrested while movement of the cage 14 continues under such control. As a consequence, the ring member 30 moves closer to the bearing member 32, as shown in FIG. 3, causing the fingers 39 to be flexed by the bearing member face 40 in the manner indicated in FIG. 3. Thus, the valve is resiliently but firmly drawn to seated position.

Should a particle of matter, such as carbon, become interposed between the valve 9 and its seat 8, the valve cannot close fully, but the resilience afforded by the means 29 allows the cage to make its full reciprocative movements without damage to the cage, cams or other parts of the mechanism. The parts of the means 29 may be adjusted even to the point of causing the spring fingers 39 to assume a permanent set, as may occur in the event of an abnormally large particle being trapped between the valve and its seat.

It will be noted that hole 38a may have ample clearance around the stem 10 so proper operation may be obtained even in cases of substantial mis-alignment of the valve and the cage. The ring member is so fitted between the walls 25 that said walls are reinforced thereby. While the disc 31 is shown solid, the same may be made up of a plurality of thinner, shim-like discs which, therefore, will have a softer flexing movement and will minimize "set" of the fingers when unduly flexed due to a large obstruction to closing of the valve.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. In a poppet valve mechanism having a poppet valve having a stem and guided to move between open and closed position and a cage controlled by a shaft having reciprocal cams thereon to reciprocate said cage, compression-compensating means interconnecting the valve and cage for reciprocating said valve between open and closed positions and allowing completion of the closing reciprocative movement of the cage after the valve has closed, said compression-compensating means comprising:

(a) a ring member having a central hole and supported by the cage and movable thereby when the cage is moving in a valve-closing direction, (b) a spring disc provided with flexible fingers affixed to said member with the fingers extending radially toward a central hole in the disc, (c) a bearing member adjustably connected to the end of the stem and disposed in engagement with the fingers of the disc on the side of the disc opposite to the side thereof to which the ring member is affixed, (d) said end of the stem being biased by the resilience of said fingers into contact with the cage on a face thereof opposite to the portion supporting the ring member, and (e) convex annular faces on said ring member and bearing member in engagement with the opposite sides of the spring fingers to flex said fingers toward the convex face on the ring member when the valve movement is arrested and the cage continues its closing reciprocative movement.

2. In a compression-compensating means according to claim 1, a flange formed on the ring member around the periphery of the spring disc, said flange being swaged around and over said disc periphery.

3. In a compression-compensating means, according to claim 1, the holes in the ring members and disc being substantially larger diametrally than the stem of the poppet valve.

4. In a poppet valve mechanism having a poppet valve having a stem and guided to move between open and closed position and a cage controlled by a shaft having reciprocal cams thereon to reciprocate said cage, compression-compensating means interconnecting the valve and cage for reciprocating said valve between open and closed positions and allowing completion of the closing reciprocative movement of the cage after the valve has closed, said compression-compensating means comprising:

(a) a ring member having a central hole and supported by the cage and movable thereby when the cage is moving in a valve-closing direction, (b) a spring disc provided with flexible fingers affixed to said member with the fingers extending radially toward a central hole in the disc, (c) a bearing member adjustably connected to the end of the stem and disposed in engagement with the fingers of the disc on the side of the disc opposite to the side thereof to which the ring member is affixed, (d) said end of the stem being biased by the resilience of said fingers into contact with the cage on a face thereof opposite to the portion supporting the ring member, (e) a convex annular face on the ring member beneath the spring fingers of the disc, and (f) a convex annular face on the bearing member engaged with the mentioned opposite side of the spring fingers at the ends thereof around the central hole of the disc, (g) said fingers being flexed by the convex face of the bearing member in a direction toward the convex face of the ring member when movement of the valve is arrested and reciprocative movement of the cage is continued.

5. In a compression-compensating means according to claim 4, a flange formed on the ring member around the periphery of the spring disc, said flange being swaged around and over said disc periphery.

6. In a compression-compensating means according to claim 4, the holes in the ring members and disc being substantially larger diametrally than the stem of the poppet valve.

No references cited.

FRED E. ENGELTHALER, *Primary Examiner.*